United States Patent [19]

Budin et al.

[11] Patent Number: 5,028,319
[45] Date of Patent: * Jul. 2, 1991

[54] APPARATUS FOR THE PREPARATION OF MACHINING LIQUID FOR AN ELECTROEROSION MACHINE

[76] Inventors: Josef Budin, Via Cadogno 3, 6648 Minusio; Hugo Kutil, Zypressenstrasse 17, 8408 Winterthur; Gideon Levy, Via Locarno 52, 6616 Losone, all of Switzerland

[*] Notice: The portion of the term of this patent subsequent to Aug. 22, 2006 has been disclaimed.

[21] Appl. No.: 395,728

[22] Filed: Aug. 18, 1989

[30] Foreign Application Priority Data

Aug. 19, 1988 [DE] Fed. Rep. of Germany ....... 3828238

[51] Int. Cl.$^5$ .............................................. B01D 65/02
[52] U.S. Cl. ................................. 210/134; 210/321.69
[58] Field of Search ........... 210/636, 411, 134, 321.69, 210/195.2, 257.2

[56] References Cited

U.S. PATENT DOCUMENTS 4,859,324  8/1989  Levy et al. .................. 210/321.78 X Primary Examiner—Frank Spear

[57] ABSTRACT

An apparatus for preparing a machining liquid of an electroerosion machine comprises a filter, to which is supplied concentrate flow from a concentrate tank and from which is drained a permeate flow. In order to obtain a high machining liquid quality the filter is constituted by a membrane filter, which is backflushed with a backflushing frequency, which is a function of a parameter of the electroerosion process.

12 Claims, 2 Drawing Sheets

APPARATUS FOR THE PREPARATION OF MACHINING LIQUID FOR AN ELECTROEROSION MACHINE

BACKGROUND OF THE INVENTION

The present invention relates to an apparatus for the preparation of a working, processing or machining liquid for a spark erosion or electroerosion machine.

Electroerosion machines typically have a working container filled with a machining or processing liquid into which is immersed a workpiece to be machined by electroerosion. In the case of wire cutting or wire eroding machines, the machining liquid consists of deionized water, whereas it consists of hydrocarbons for countersinking machines. As a result of the erosive removal of particles from the workpiece, the cleanness of the machining liquid is reduced, so that its electrical conductivity changes.

In order to maintain a desired quality of the electroerosion operation, it is necessary to clean or purify the machining liquid, so as to maintain its electrical characteristics and cleanness within predetermined ranges.

The prior art has generally made use of conventional filters for the preparation of the machining liquid; those filters have, however, a comparatively large pore diameter. In the case of the large pore sizes of such conventional filters, the filtering action is not sufficient to maintain the machining liquid of an electroerosion machine within a desired quality range for a period of several days. However, the filter walls become clogged on reducing the pore diameter of the conventional filters for increasing the filtration quality.

It is generally known in the filter technology field to use membrane filters, which have extremely small pore-cross-sections compared with the pore sizes of conventional filters of other types. However, membrane filters have been considered unsuitable for the coarse filtering of the concentrate in electroerosion technology because of the fear of a rapid clogging of the membrane filter due to the high solids proportion in the concentrate.

Therefore membrane filters have only been used for extremely specialized purposes in the preparation of the machining liquid for electroerosion machines but never for cleaning or preparing the concentrate. For example, JP-OS 62-24917 discloses an apparatus for the preparation of the machining liquid of an electroerosion machine, in which use is made of a membrane filter. The known apparatus comprises a container for the machining liquid, which is subdivided into two areas by a cellophane membrane. The first area is connected by means of a pump, downstream of which a convention filter is connected to the working zone of the electroerosion machine which, by means of a further pump, can again be discharged into said first area of the container. The second container area is connected by still another pump to an ion exchanger. The ion concentration in the second container area is well below the ion concentration in the first container area, so that it is possible to operate the ion exchanger with a favorable, low ion density for its operating behavior. In this known apparatus for the preparation of the machining liquid, a conventional filter is consequently used for filtering the concentrate, whereas a member filter is used only for the adjustable reduction of the ion density for a circulation of an ion exchanger.

It has been known in the field of filter technology using membrane filters to carry out a periodic backflushing of the membranes, so that a dirt cake which has accumulated during operation of the membrane can be washed away. In known membrane filtration plants, a time control has been used for this purpose to control a brief backflushing process at the end of a predetermined filtration time. However, in such a filtration plant, the backflushing time intervals can only be set in an economic manner, if the dirt cake builds up on the membrane wall at a substantially invariable speed on the basis of a forecastable, constant filter cake production.

SUMMARY OF THE INVENTION

It is an object of the present invention to provide an improved apparatus for the preparation of a machining liquid for an electroerosion machine which, despite the widely differing dirt or non-filtered particle quantity produced per unit of time in the different operating modes of an electroerosion machine, would maintain a high quality of the machining liquid of the machine over a long period of time.

According to the invention this and other objects of the invention are attained by an apparatus for the preparation of the machining liquid of an electroerosion machine, which comprises a membrane filter and a backflushing device by which a permeate is forced from a permeate side through a filter membrane to a concentrate side.

The present invention is based on the finding that, contrary to the hitherto held opinion, a membrane filter can be used for cleaning the concentrate of an electroerosion machine if it is cleaned with a backflushing frequency dependent on a parameter of the electroerosion process, which, in turn, provides information on the extent of the dirt particles production during electroerosion. Thus, it is possible in the case of a coarse cutting of a workpiece to take account of the high dirt production by a high backflushing frequency, whereas in the case of a fine cutting, the backflushing frequency can be drastically reduced.

Particular practical significance is attached to the idea of controlling the backflushing frequency as a function of the time integral via the electric power consumption or the flame cutting current of the electroerosion machine. It is easy to control the backflushing frequency as a function of the time integral via the flame cutting current because the flame cutting voltage remains approximately constant, independently of the operation of the electroerosion machine, so that the flame cutting current is proportional to the efficiency during electroerosion. The power consumption during electroerosion is closely linked to the quantity of particles cut from the workpiece per unit of time and representing the amount of dirt particles produced on the concentrate side during electroerosion. Thus, through time integration of the power consumption or the flame cutting current of the electroerosion machine, it is possible to produce a suitable quantity which, with a good accuracy level, constitutes a measure for the amount of dirt accumulated on the membrane wall. As the dirt amount produced per unit of time can vary widely, this measure makes it possible with the backflushing method only suitable for constant dirt production with periodic backflushing, to carry out a preparation of the machining liquid adapted to the widely fluctuating, special needs of electroerosion.

It has also been found that the dirt cake builds up to a particularly marked extent at the concentrate flow inlet of the membrane filter. According to a further preferred embodiment of the invention, the flow direction of the concentrate flow through the filter is reversed and then backflushing performed. Thus, the dirt particles which have been forced off the membrane wall during the backflushing and which are then present in high concentration, would no longer pass through the entire membrane filter and would instead be led off along a direct route. It is particularly advantageous in this phase to additionally perform a disposal of the "dirt circulation", in that at least part of the concentrate flow is passed over a fleece filter. As a result of the combination of these three measures, an excellent cleaning of the complete filter circuit is obtained, whilst simultaneously effecting the removal of dirt particles. This makes it possible to considerably increase the use time of the membrane filter.

The invention will be described in greater detail hereinafter relative to a preferred embodiment and with reference to the attached drawings.

DETAILED DESCRIPTION OF THE PREFERRED EMBODIMENT

Figure 1:
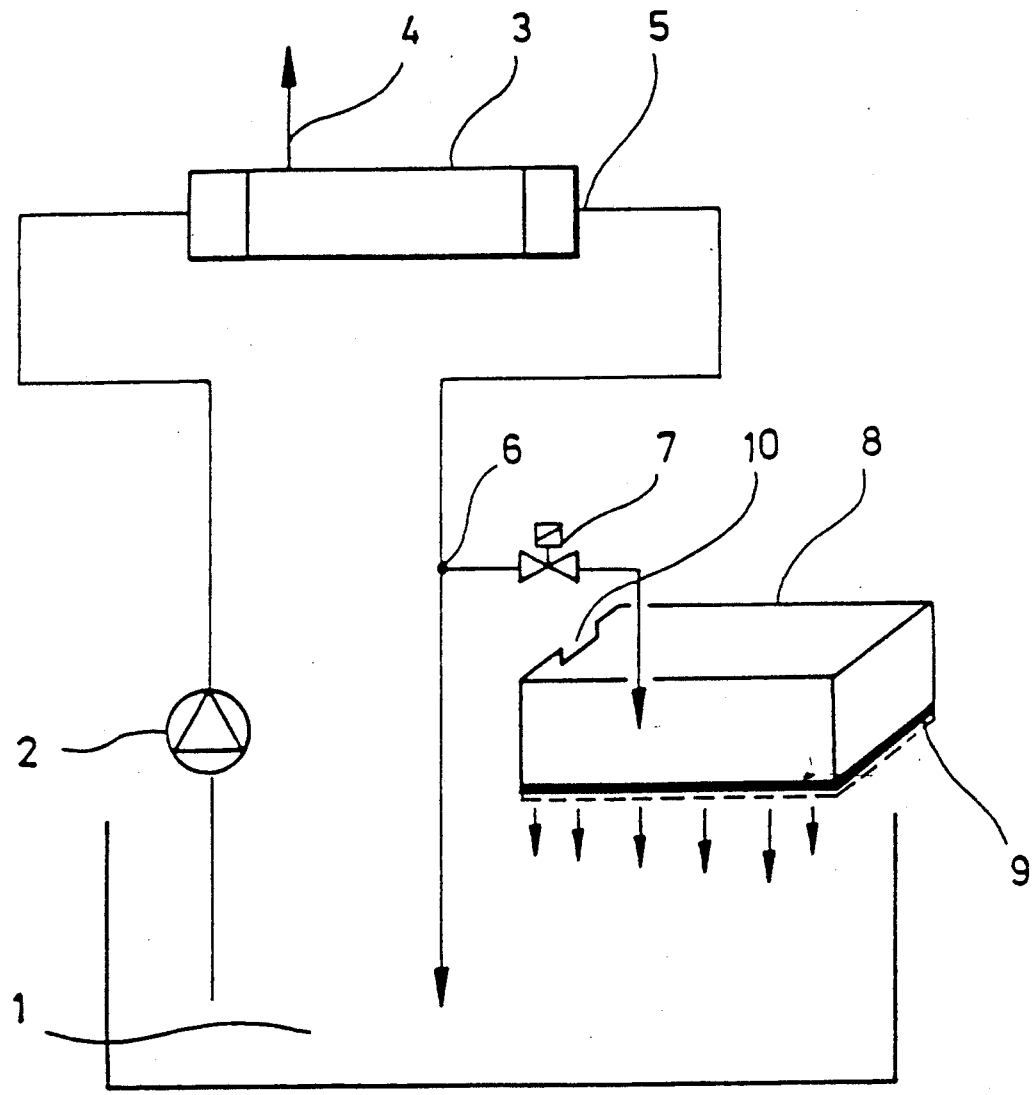
FIG. 1 is a diagrammatic overall view of an apparatus for preparing the machining liquid of an electroerosion machine according to the invention.

Referring now to the drawings in detail, an apparatus for the preparation of the machining liquid of an erosion machine contains a concentrate tank 1. From the latter a pump 2 delivers a concentrate flow to a membrane filter 3, from which a permeate is drained off at a permeate outlet 4. The concentrate flow further enriched with solids is from a filter outlet 5 returned to the concentrate tank 1 following the branching off of the permeate. Part of the return concentrate flow is supplied downstream of the branch by an electrically operable valve 7 further indicated as a partial flow valve to a disposal container 8. The latter is constructed as a wire basket in which is placed a fleece filter 9. The disposal container 8 is positioned above the concentrate tank 1, so that the partial concentrate flow which has passed through the fleece filter 9 of container 8 is led back into the concentrate tank 1 via a conduit 9a.

During filtering a filter cake builds up on the surface of the fleece filter 9, which consists of the accumulated solids which have separated from the concentrate. This filter cake reinforces the filtering action of the fleece filter 9.

The disposal container 8 is provided with an overflow 10, which allows an overflow of concentrate from disposal container 8 into concentrate tank 1 if the concentrate partial flow to container 8 is greater than the pre-purified concentrate quantity which has trickled through the filter cake and the fleece filter 9.

As a result of a suitable control of the partial flow valve 7 either periodically or discontinuously larger partial flow quantities per unit of time are supplied or constantly a smaller partial flow quantity is supplied to the disposal container 8.

Figure 2:
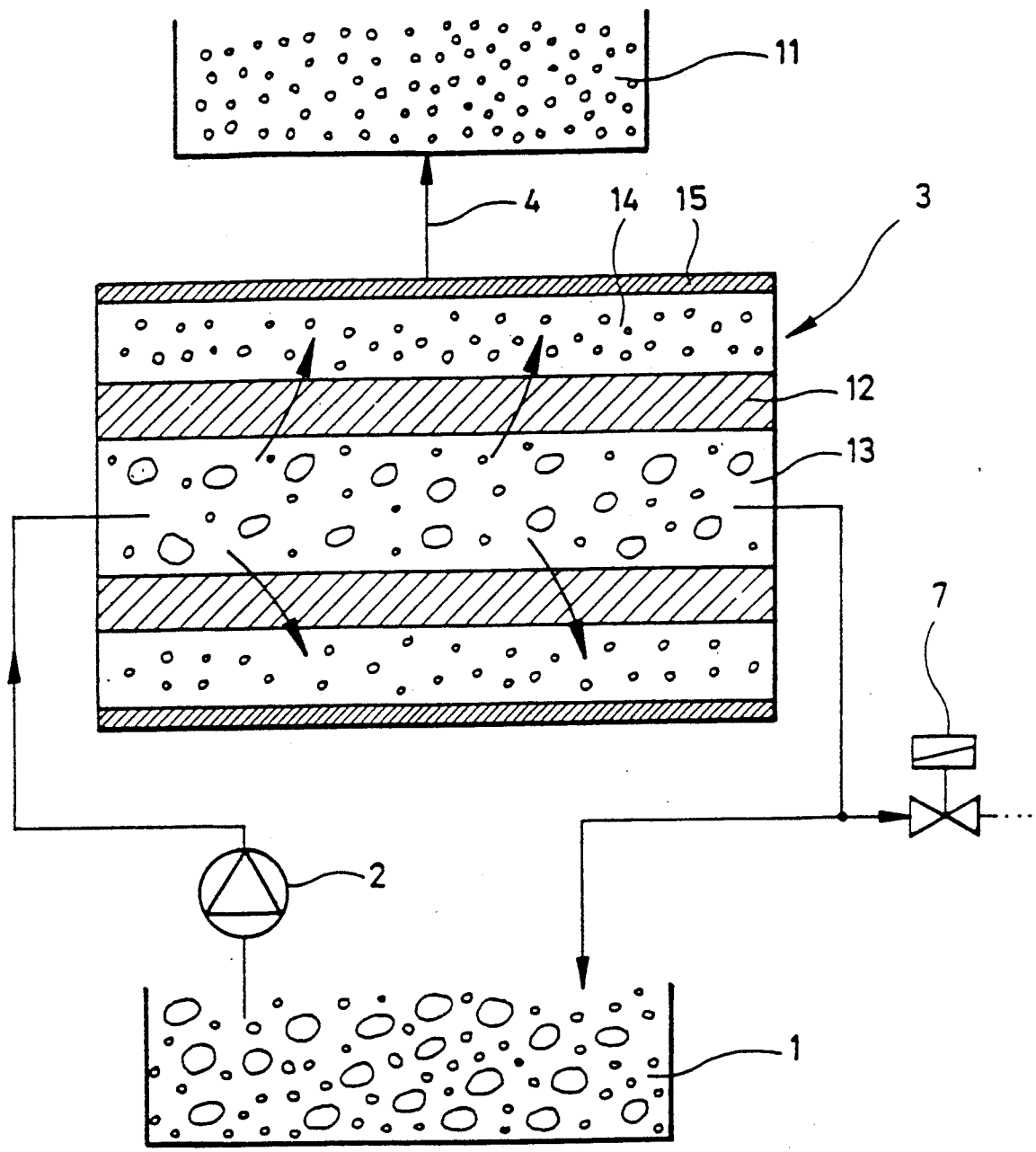
FIG. 2 is a sectional view through a membrane filter, as used in an apparatus according to FIG. 1.

As seen in FIG. 2, the membrane filter 3 comprises a tubular membrane 12, which separates a concentrate area 13 from a permeate area 14. Membrane filter 3 is enclosed with a cylindrical wall 15. The concentrate flow through concentrate area 13 is passed from a concentrate inlet 5a to a concentrate outlet 5b parallel to membrane 12.

The drawings sow a single membrane filter 3. However, in a practically realized, preferred embodiment, a plurality of identical filter elements 3 are provided in parallel flow connection. As a result of the construction of the membrane filter as a plurality of tubular filter elements, it is possible to achieve a large filtering surface with minimum space requirements.

The membrane filter 3 is preferably made of hollow fibers of polypropylene and having a diameter of approximately 1.5 mm and a pore size of approximately 0.2 $\mu$m. As can be seen in FIG. 2, the membrane filter 3 is connected at its permeate outlet 4 to a permeate container or clean tank 17 from which the permeate is pumped to a working container of the spark erosion machine.

Apart from the working container 11 and concentrate tank 1, the apparatus for the preparation of the machining liquid comprises a receiver or collecting tank 16 and a clean liquid tank 17. The content of the working container 11 can be supplied to the receiver 16 via a discharge line 18. By means of a second pump 19 the content of the receiver 16 can be pumped after sedimentation of the concentrate into concentrate tank 1. In addition, the working container 11 is in direct communication with the concentrate tank 1 via a return flow line 20. Behind the first pump 2 is positioned a pressure gauge 21, a coarse filter 22 and a screen or shield 23, by which a supply line 26 is subdivided into two branches which pass to two inlet valves 24, 25. The first inlet valve 24 is connected to the membrane filter 3 at one side thereof, whilst the other inlet valve 25 is connected to filter 3 at its other side. The pressure upstream and downstream of the filter 3 is monitored by means of second and third pressure gauges 27, 28. In the concentrate area of membrane filter 3, besides inlet valves 24, 25 are provided outlet valves 29, 30, which are connected to the concentrate tank 1 by a concentrate return line 31. The latter is subdivided by the partial flow valve 7 into a disposal container line 32, a shield line 33 having a shield 34 and opening into concentrate tank 1, and a pressure relief line 35 having a contaminated or dirt-side pressure relief valve 36 and also extending to concentrate tank 1.

Inlet valves 24, 25 and outlet valves 29, 30 are controlled in such a way that on opening of the inlet valve 24, the further inlet valve 25 is closed, whilst the outlet valve 30 is opened and the outlet valve 29 facing the first inlet valve 24 is closed. As a result of this valve opening an closing combination, a flow direction is established, which runs from left to right in FIG. 1. It is possible to reverse the flow direction through membrane filter 3, in that the inlet valve 25 and outlet valve 29 are opened, whilst inlet valve 24 and outlet valve 30 are closed.

The permeate outlet 4 of the membrane filter 3 is connected to a buffer container 39 for the backflushing of the membrane filter 3. Buffer container 39 can be vented by means of a vent valve 40 and can be subjected to the action of compressed air by opening a compressed air valve 41 from a compressed air source 42a for cleaning membrane filter 3. The pressure of compressed air can be monitored by a fourth pressure gauge 42.

Buffer container 39 is connected to the clean liquid tank 17 by means of a return flow line 44 having a return flow valve 43. The permeate which has accumulated in the clean liquid tank 17 is returned by means of a third pump 45 via a permeate line 46 to the working container 11. This return of the permeate to the working container 11 preferably takes place at a delivery rate of approximately 50 to 60 liters/minute.

A feed valve 47 for an acid backflushing of the membrane filter 3 is connected to the permeate outlet 4 of membrane filter 3. The same function is fulfilled by two drain valves 37, 38 permitting the complete draining of membrane filter 3. The acid backflushing of membrane filter 3 for the total cleaning thereof can be brought about in that, following the shutting off of all the remaining inflow or outflow valves 40, 41, 24, 29, 30, 25, an acid is introduced through the feed valve 47 into membrane filter 3 and is used for the total cleaning of the membranes of the filter. Drain valves 37, 38 are used for draining the acid from membrane filter 3 and removing the acid and the residues which have been flushed out of the membranes of membrane filter 3.

Following the above explanation of the inventive apparatus for the preparation of the machining liquid of an electroerosion machine, the operation thereof will now be described.

The control of the complete apparatus shown in the drawings takes place by means of a commercially available process computer. The latter also controls the operation of the individual valves for the backflushing of the membrane filter 3.

In a preferred embodiment described herein, at the end of the last backflushing process, the process computer determines the time integral of the flame cutting current. As soon as the time integral over the flame cutting current has reached a given value, which corresponds to the erosion capacity and therefore the dirt particle concentration in the machining liquid, the backflushing process is initiated. For this purpose, return valve 43 is closed and the compressed air valve located between compressed air source 42a and the buffer container 39 is opened. As a result of the air pressure acting on the permeate in the buffer container 39 and which is transferred to the membranes, the dirt particles are separated from the concentrate side of the membrane wall. The increased removal of dirt particles and acceleration of the flow of dirt particles are obtained in that the pressure at the dirt-side outlet of membrane filter 3 is reduced, which is brought about in that the pressure relief valve 36 in the pressure relief line 35 is open. From the flow standpoint, pressure relief valve 36 is in the form of a bypass parallel to shield 34 in the concentrate return line 31.

During the backflushing process the flow in the circuit of dirt particles must be maintained, so that the dirt particles which have been detached from the membrane wall can be conveyed away.

It is particularly advantageous if immediately following on to the backflushing process, the concentrate flow direction through the membrane filter 3 is reversed, which is brought about by operating valves 24, 29, 25 and 30. Pump 2 is switched off during the backflushing process. As dirt particles mainly accumulate at the concentrate inlet of the membrane filter 3, they no longer have to pass through the complete filter following backflushing, if the flow direction is reversed in a time-linked manner with the backflushing operation.

The process computer controls the backflushing frequency not only as a function of the integral over the flame cutting current, but also as a function of the workpiece material, the particle composition and predetermined technological data or data of the generator of the electroerosion machine. These additional parameters, over and beyond the integral over the flame cutting current, can be readily fixed by simple electroerosion tests in the case of a predetermined current integral.

Only a limited cleaning of the membrane is achieved by backflushing. Over a period of time the membrane filter becomes increasingly clogged. It is therefore unavoidable that following long operating periods, the membrane filter will have to be completely cleaned. According to the present invention the need for total cleaning is established by the process computer either by monitoring the backflushing frequency or by counting the backflushing processes. If the filtering time period between two backflushing processes has reached such a low value that the total cleaning of the filter is considered necessary, then the process computer operates the feed valve 47 with the transverse flow in the filter interrupted and opens the drain valves 37, 38. In this state, an acid is introduced through the permeate outlet 4 for the total cleaning of the membrane filter. Dirt particles and other substances which have been deposited on the membrane are washed out by the acid, so that the filter again achieves its previous permeability.

Another parameter from which it is possible to determine the need for the backflushing operation is the pressure drop along the membrane filter and which is determined by means of the differential pressure at the inlet and outlet and for this purpose pressure gauges 27 and 28 are provided. The more the filter 3 is contaminated, the greater will be this pressure drop. As with increasing contamination of the filter 3 said pressure drop occurs at shorter intervals after each backflushing, it is possible to determine therefrom the need for a total cleaning.

After such a total cleaning it is necessary to carry out the permeate flushing of the filter to ensure that all acid residues have left the filter 3. To this end and with the acid feed valve 47 closed and the drain valves 37, 38 open, permeate from buffer container 39 is flushed by pressure action through the filter.

While particular embodiments of the present invention have been shown as described, it will be obvious to those skilled in the art that changes and modifications may be made without departing from the invention in its broader aspects. Therefore, the aim in the appended claims is to cover all changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. Apparatus for preparing a machining liquid of an electroerosion machine, comprising a concentrate tank; a filter to which a concentrate flow is supplied from said concentrate tank and from which a permeate flow is drained off, said filter being a membrane filter; and a backflushing device provided for and connected to said membrane filter and which, during backflushing, forces a permeate from a permeate side of said filter through a membrane thereof to a concentrate side of the membrane filter, said backflushing device performing backflushing in each case at the end of a filtration period which is a function of a parameter of an electroerosion process.

2. Apparatus according to claim 1, wherein the parameter of the electroerosion process is a time integral over a power consumption of a working gap of the electroerosion machine.

3. Apparatus according to claim 1, wherein the parameter of the electroerosion process is a time integral over a flame cutting current of the electroerosion machine.

4. Apparatus according to claim 1, wherein said filtration period is determined also as a function of workpiece characteristics and operating data of an electroerosion machine generator.

5. Apparatus according to claim 1, wherein said backflushing device includes a buffer container connected to a permeate outlet of said membrane filter, a return flow valve located in a return flow line connected between said buffer container and a clean machining liquid tank for the permeate and which is closed on backflushing of said membrane filter, and a compressed air source connected by means of a compressed air valve to said buffer container, said compressed air valve being opened during backflushing.

6. Apparatus according to claim 5, wherein said backflushing device further includes a pressure relief valve operable during backflushing and which is positioned parallel to a shield connected in a concentrate return line provided between said membrane filter and said concentrate tank.

7. Apparatus according to claim 6, wherein said backflushing device is designed to determine a time period between two successive backflushing processes and establish the need for a total cleaning of said membrane filter when said time period drops below a predetermined value.

8. Apparatus according to claim 6, wherein said backflushing device is designed to count the number of backflushing processes and establish the need for a total cleaning of said membrane filter if the number of backflushing processes exceeds a predetermined value.

9. Apparatus according to claim 7, wherein said backflushing device further includes an acid feed valve on the permeate outlet of said membrane filter and at least one drain valve on the concentrate side and a further drain valve on the permeate side of said membrane filter, and wherein by operating the feed valve and each drain valve, said backflushing device performs an acid flushing of said membrane filter when the need for a total cleaning has been established.

10. Apparatus according to claim 8, wherein said backflushing device further includes an acid feed valve on the permeate outlet of said membrane filter and at least one drain valve on the concentrate side thereof and a further drain valve on the permeate side of said membrane filter, and wherein by operating said feed valve and each drain valve, said backflushing device performs an acid flushing of said membrane filter when the need for a total cleaning has been established.

11. Apparatus according to claim 1, and further comprising a fleece filter, and wherein on the concentrate side of said membrane filter is provided a branch by means of which a partial flow can be branched off from said membrane filter to said fleece filter, said partial flow being branched to said fleece filter during the backflushing of said membrane filter.

12. Apparatus according to claim 1, and further comprising a flow direction reversing device for reversing the concentrate flow direction through said membrane filter, said reversing device being also operable as a function of a parameter of the electroerosion process.

* * * * *